United States Patent [19]

Keller et al.

[11] Patent Number: 4,513,629
[45] Date of Patent: Apr. 30, 1985

[54] SHOCK RESPONSIVE DEVICE

[75] Inventors: William F. Keller, West Covina; Richard D. Sibley, Anaheim, both of Calif.

[73] Assignee: Koso International, Inc., Sante Fe Springs, Calif.

[21] Appl. No.: 420,050

[22] Filed: Sep. 20, 1982

[51] Int. Cl.³ ............... G05G 17/00; F16K 17/36
[52] U.S. Cl. .................................. 74/2; 74/520; 137/38; 200/61.45 R; 200/153 G; 251/74; 251/280
[58] Field of Search .............. 74/2, 106, 520; 137/38, 137/73, 74; 200/61.45 R, 61.52, 153 G; 251/73, 74, 280

[56] References Cited

U.S. PATENT DOCUMENTS

| 1,578,354 | 3/1926 | O'Keeffe | 200/153 G |
| 2,017,274 | 10/1935 | Breitenstein | 200/52 |
| 2,031,458 | 2/1936 | Bush | 74/2 |
| 2,206,067 | 7/1940 | Waltamath | 200/52 |
| 2,927,982 | 3/1960 | Slough | 200/61.47 |
| 3,104,384 | 9/1963 | Slate | 74/2 X |
| 3,358,207 | 12/1967 | Natho | 74/520 X |
| 3,788,596 | 1/1974 | Maeda | 74/2 X |
| 3,878,858 | 4/1975 | Yamada | 137/38 |
| 4,007,643 | 2/1977 | Matsushita | 74/2 |
| 4,185,507 | 1/1980 | Domyan | 74/2 |

FOREIGN PATENT DOCUMENTS 569637  2/1933  Fed. Rep. of Germany ... 200/153 G

Primary Examiner—Allan D. Herrmann
Attorney, Agent, or Firm—William P. Green

[57] ABSTRACT

An actuator responsive to seismic or other shock forces includes a first swinging arm yieldingly urged pivotally in one direction and releasably retained against such swinging movement by shock responsive means acting to permit swinging movement of the arm in response to predetermined shock forces, a second arm for actuating a controlled element and which is swung through an angle shorter than the first arm by a mechanical advantage linkage including two links pivotally connected together at first ends and pivotally connected at second ends to a support structure and to the mentioned second arm, together with a third link operable to swing the first and second links from relatively angularly disposed positions toward aligned and preferably overcenter positions in response to the swinging movement of the first arm to cause the desired relatively smaller movement of the second arm with resultant increased force applicable to the controlled element.

10 Claims, 8 Drawing Figures

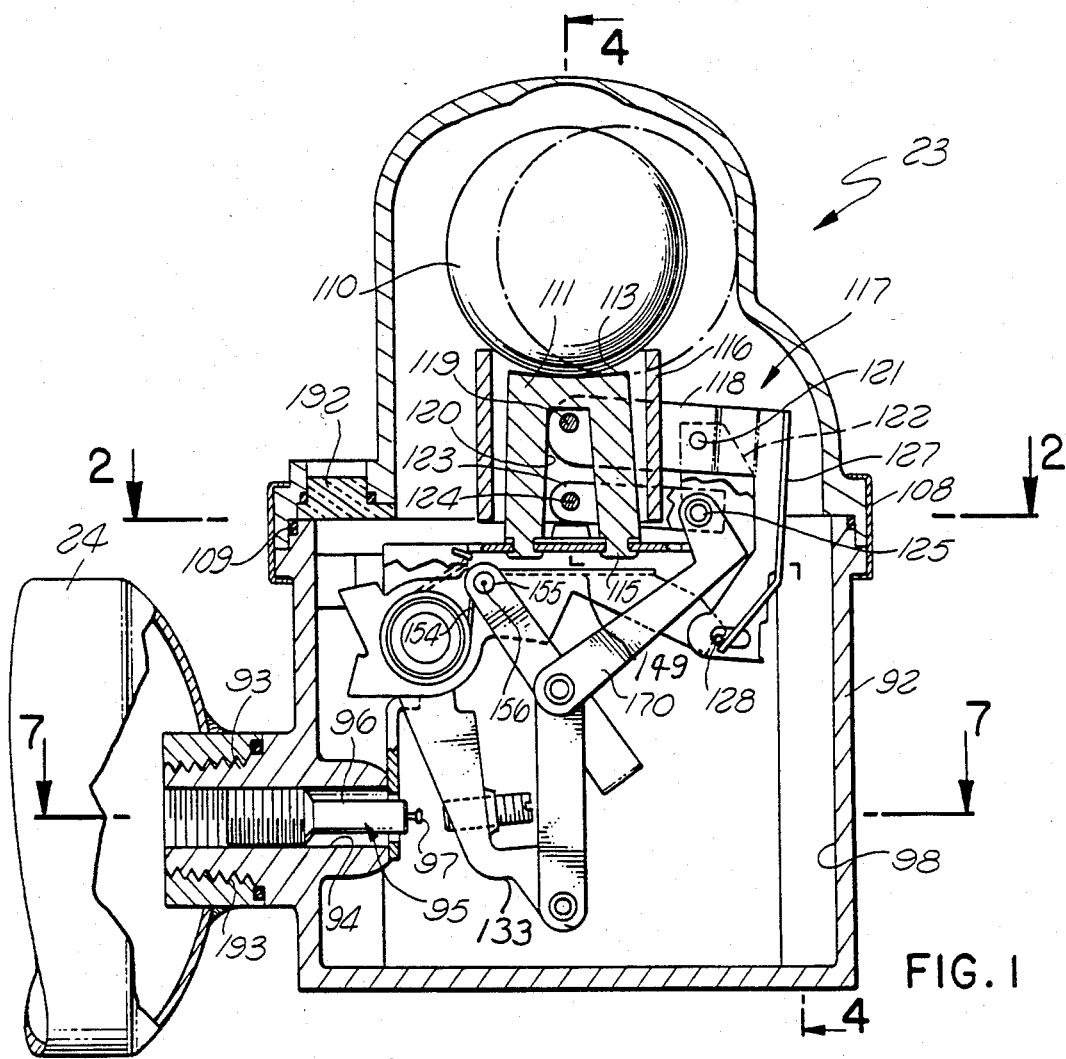
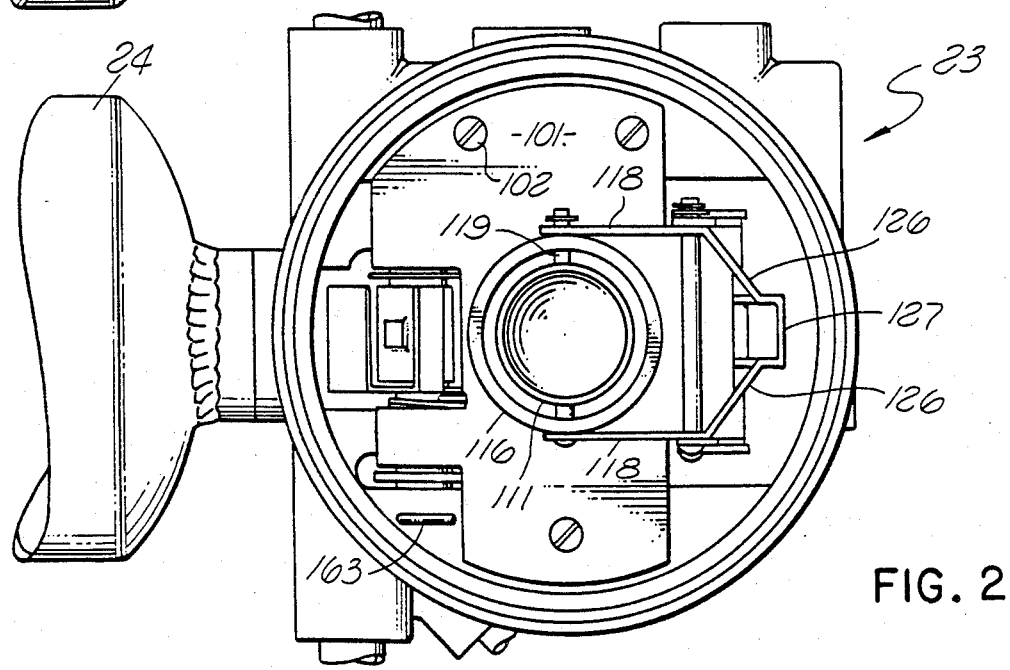

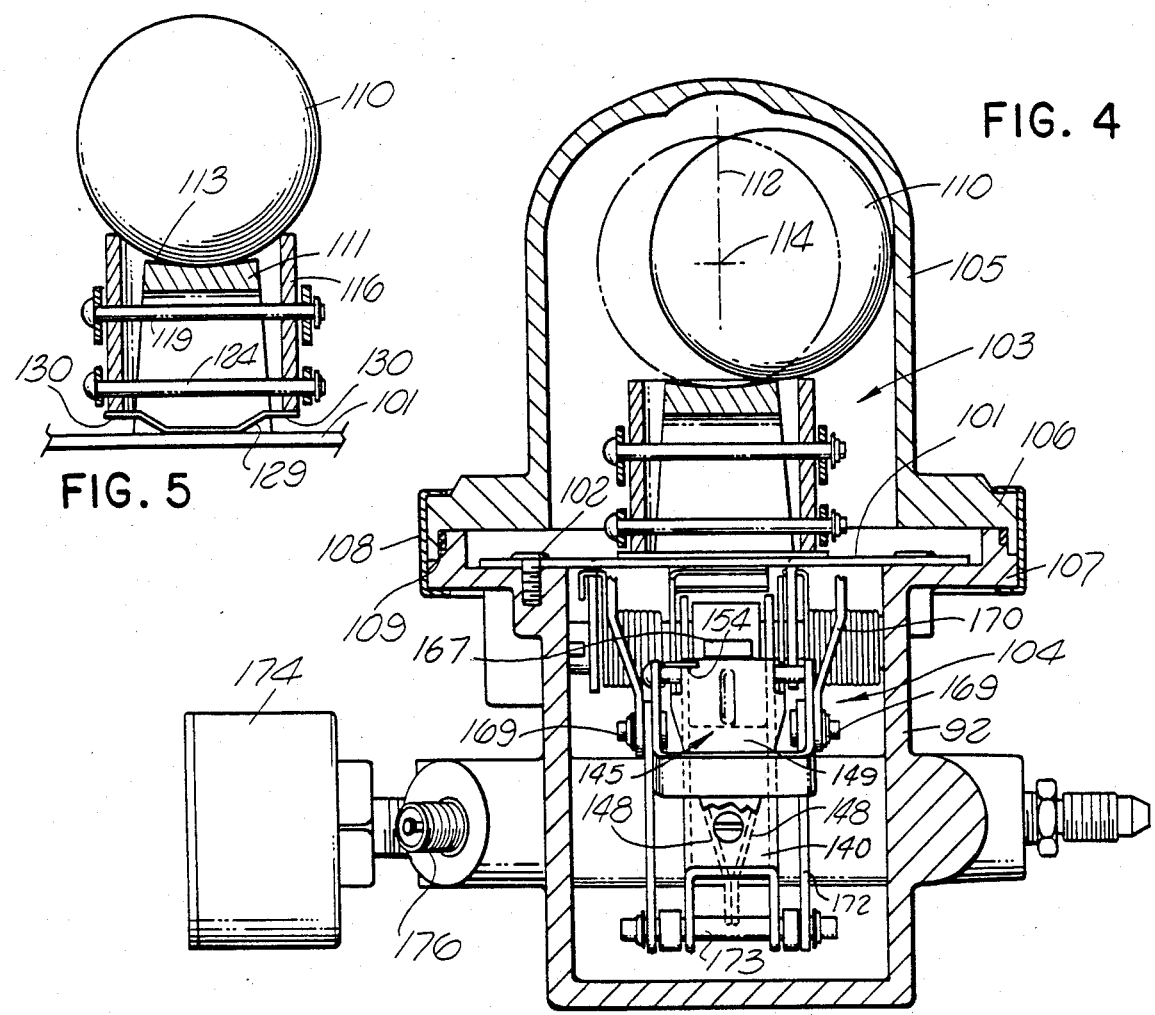
FIG. 5
FIG. 4
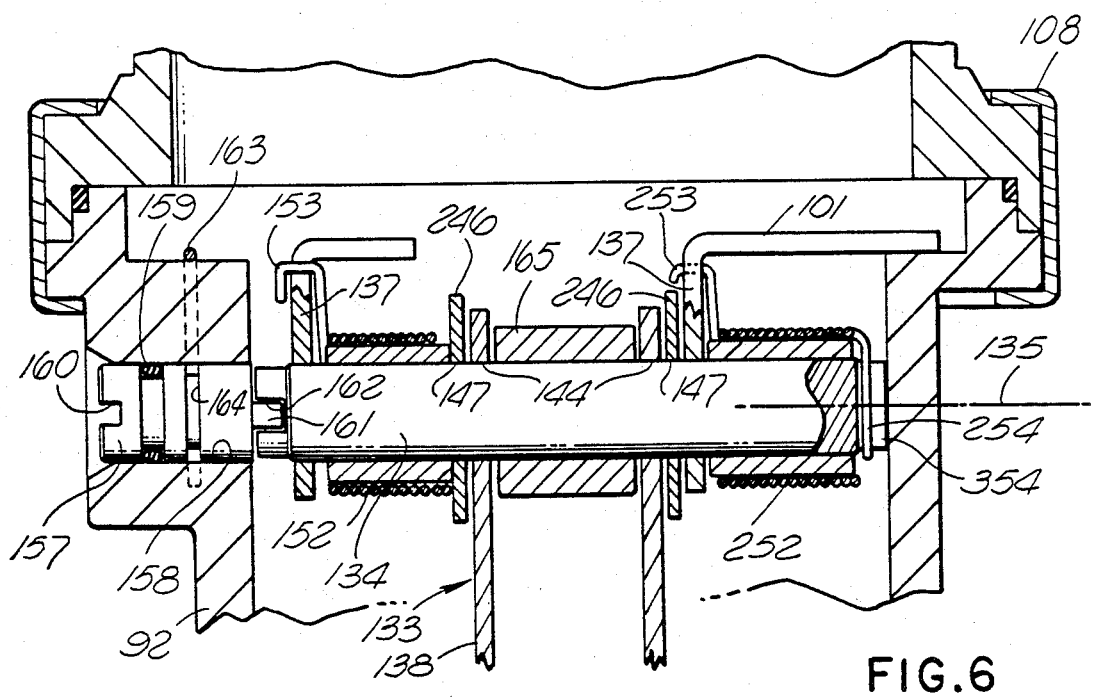
FIG. 6

SHOCK RESPONSIVE DEVICE

BACKGROUND OF THE INVENTION

This invention relates to improved devices for actuating a valve or other controlled element automatically in response to an earthquake, vibration, or other predetermined shock forces.

The devices of the present invention are preferably of a known type including an inertia actuated weight and an associated structure which moves relative to the weight when the assembly is subjected to shock forces, with that relative displacement then being utilized to actuate a controlled element for attaining a desired purpose such as closing off the flow of a fluid through a pipeline. Typical devices for this purpose are shown in U.S. Pat. No. 4,185,507 issued Jan. 29, 1980 to Frank M. Domyan, and in our copending application Ser. No. 381,329 filed May 24, 1982 on "Magnetically Actuable Shock Responsive Unit".

A major purpose of the present invention is to provide an improved shock responsive actuator of this general type which is capable of applying a greater force to the controlled element in the actuated condition of the unit than has been possible with most prior devices of which we are aware. For example, a mechanism embodying the invention can function to open a valve against a substantial pressure, to release compressed air or another pressurized fluid for flow through the valve to a desired location. The mechanism may also function to effectively lock the controlled element in its actuated condition until the device is purposely reset to a cocked condition. The apparatus is very simple structurally and reliable in operation and occupies relatively little space.

To achieve these results, a unit embodying the invention includes two swinging arms, one of which is latched in a predetermined position by shock responsive means and is adapted to be released for movement from that position to a second position when the unit is subjected to an earthquake or other shock forces. The second arm acts by swinging movement to actuate the valve or other controlled element, and is actuable by the first arm through a mechanical advantage linkage which swings the second arm through a smaller angle than the first arm but with greater force. This linkage desirably includes two links pivotally connected at first ends thereof to swing between angularly disposed positions and essentially aligned preferably slightly overcenter positions, with a third link connecting one or both of the first and second links to the first mentioned arm for actuation thereby. The three links are desirably connected pivotally together at a common axis.

BRIEF DESCRIPTION OF THE DRAWINGS

The above and other features and objects of the invention will be better understood from the following detailed description of the typical embodiment illustrated in the accompanying drawings in which:

FIG. 1 is a vertical section through a shock responsive actuator constructed in accordance with the invention;

FIG. 2 is a horizontal section taken on line 2—2 of FIG. 1, with the inertia responsive ball and cover removed;

FIG. 4 is a transverse vertical section taken on line 4—4 of FIG. 1;

FIG. 5 corresponds to a portion of FIG. 4, with the weight in its centered position;

FIG. 6 is a vertical section taken on line 6—6 of FIG. 3; and

DESCRIPTION OF THE PREFERRED EMBODIMENT

Figure 7:
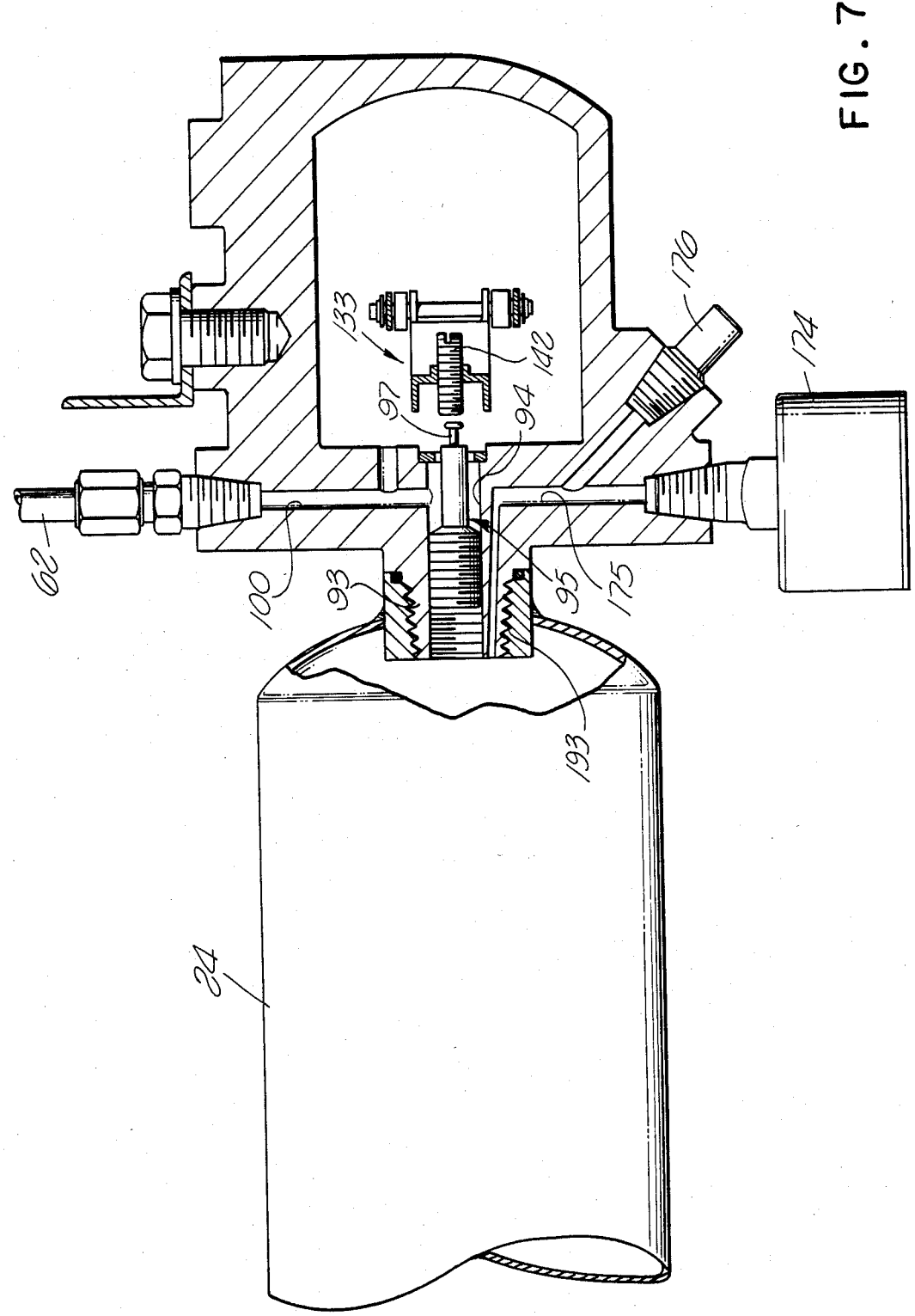
FIG. 7 is a horizontal section taken on line 7—7 of FIG. 1.

The shock responsive unit 23 illustrated in the drawings preferably functions, upon subjection to earthquake or other shock forces of predetermined intensity, to automatically admit compressed air or another fluid from a pressurized tank 24 to a line 62 (FIG. 7) leading to a fluid actuated or responsive controlled device 10.

Unit 23 may have a lower hollow body section 92 with a tubular inlet portion 93 connected threadedly at 193 to the mouth of compressed air tank 24. Portion 93 of body section 92 contains a passage 94 within which an air valve 95 of the type commonly used in automobile tires and other inflatable devices is mounted. This valve 95 has a tubular body 96 containing a valve element 97 which is spring pressed rightwardly as viewed in FIG. 1 to a closed position of engagement with a shoulder in body 96 to normally prevent flow of the compressed air from tank 24 into the interior of section 92 of unit 23. Air can flow leftwardly from the chamber 98 in part 92 to fill the tank, and can flow rightwardly from the tank into chamber 98 when the stem of valve element 97 is pressed leftwardly. Air thus admitted into chamber 98 can flow through a passage 100 in a side of that chamber (FIG. 7) into line 62 leading to unit 10.

A mounting plate 101 extends across the upper side of chamber 98; being secured thereto by screws 102, and carries at its upper side a mechanism 103 for responding to shock forces and at its underside a related mechanism 104 which is actuable automatically by mechanism 103 to open valve 95 when the mechanism 103 is actuated by such forces. A dome shaped upper housing section 105 extends about and encloses mechanism 103, and may have a lower circular edge 106 secured detachably and peripherally to circular edge 107 of section 92 by an annular clamp structure 108, with a seal being formed between the two connected body or housing elements by annular seal ring or gasket 109.

Mechanism 103 is similar to a device illustrated in U.S. Pat. No. 4,185,507 issued Jan. 29, 1980 to Frank F. Domyan, and is also similar to a seismic actuator disclosed in copending application Ser. No. 381,329 filed May 24, 1982 by the inventors of the apparatus shown in the present application. Mechanism 103 includes a preferably spherical inertia actuated weight or mass 110 which is normally supported on a pedestal 111 projecting upwardly from and above mounting plate 101 along a vertical axis 112. The upper end of pedestal 111 contains an upwardly facing shallow recess 113 within which ball 110 is supported with its center 114 located on the vertical axis 112 of the device. The pedestal may be externally cylindrical and be secured rigidly to plate 101 by extension of lower connector lugs 115 of the pedestal through openings in plate 101, with those lugs being upset as illustrated to connect the parts rigidly together. The ball is displaceable from its FIGS. 1 and 5 position relative to the pedestal, as to the broken line position of FIG. 1 or the full line position of FIG. 4, by shock induced movement of the pedestal relative to the ball, during which movement the inertia of the weight resists movement thereof with the pedestal.

For response to this displacement of the ball, a vertical tube 116 is disposed about the pedestal and movable upwardly and downwardly relative thereto. The tube may be mounted for this vertical movement by a parallelogram mechanism 117, including two similar parallel upper links 118 each pivoted at one end to the tube by a horizontal pin 119 extending through a vertical slot 120 in pedestal 111, and each pivoted by a second parallel horizontal pin 121 to a pair of vertical bracket arms 122 projecting upwardly from plate 101. The parallelogram mechanism also includes two similar parallel lower links 123 each pivoted by a first pin 124 to the tube and by a second pin 125 to the bracket arms 122. The two upper links 118 may be stamped integrally from a single piece of sheet metal, having converging portions 126 extending from links 118 to a channel shaped portion 127 of the sheet material forming an arm projecting downwardly and carrying a cross pin 128 which acts to engage and latch the mechanism 104 at the underside of mounting plate 101 in the FIGS. 1 and 3 condition.

When inertia actuated weight 110 is displaced laterally in any direction by shock forces, it engages the upper end of tube 116 and displaces that tube downwardly in a manner causing rightward unlatching movement of pin 128. The downward movement of the tube is resisted by a leaf spring 129 (FIG. 5) which may be welded or otherwise secured at a central location to plate 101 and have end portions 130 urged upwardly by resilience of the material of the spring and applying yielding upward force to tube 116 at diametrically opposite locations.

The mechanism 104 at the underside of plate 101 includes a swinging arm 133 pivotally connected at its upper end to a horizontal shaft 134, which may in turn be mounted for rotary motion about its axis 135 by extension of the shaft through bearing openings 136 formed in two vertical parallel bracket arms 137 projecting downwardly from and formed from the material of mounting plate 101. Arm 133 may be stamped from sheet metal, defining two parallel vertical side walls 138 of arm 133 joined by a transverse portion 139 of the arm extending first generally vertically at 140 and then generally horizontally at 141. The generally vertical transverse portion 140 of arm 133 carries a valve actuating element 142 which is adapted to engage and actuate the end of the stem of valve 95, and which is connected to portion 140 threadedly at 143 to enable adjustment of the point in the swinging movement of arm 133 at which the valve will be opened. The upper portions of the two parallel side walls 138 of arm 133 contain circular openings 144 within which the externally cylindrical shaft 134 is a close fit to mount the arm for swinging movement between the FIG. 3 and FIG. 3A positions.

Figure 3:
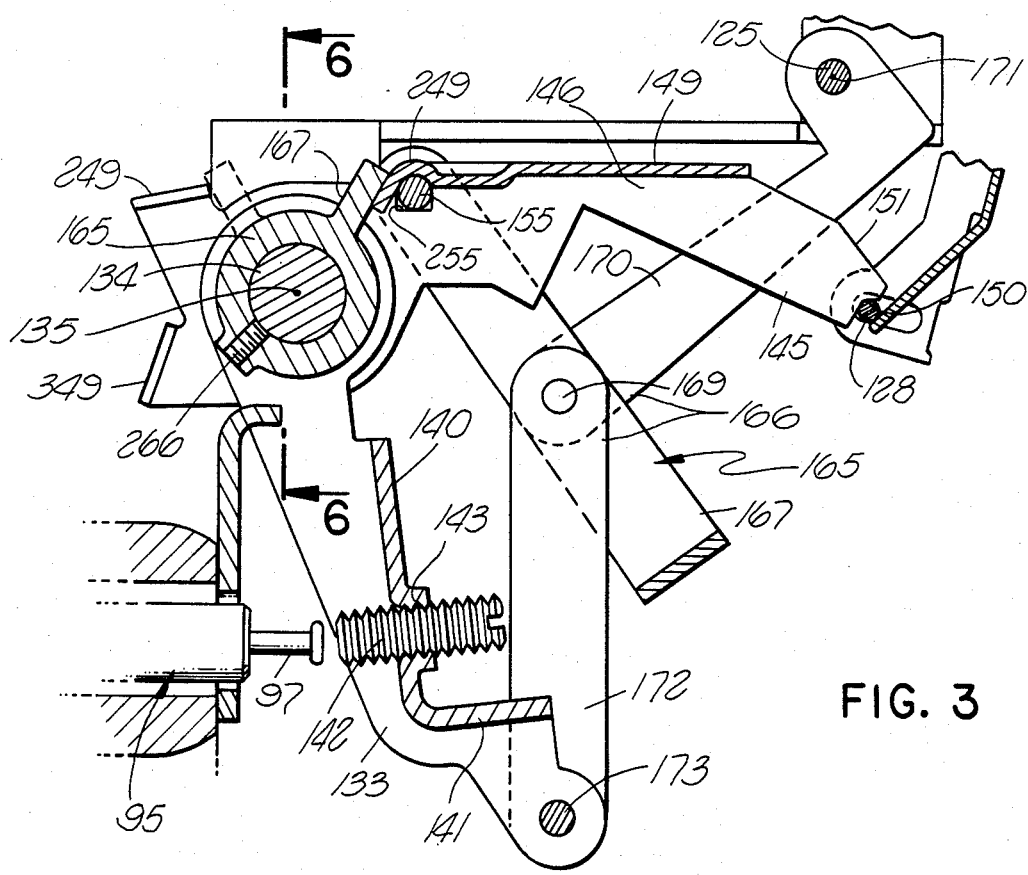
FIG. 3 is an enlarged fragmentary vertical section similar to a portion of FIG. 1.
Figure 3A:
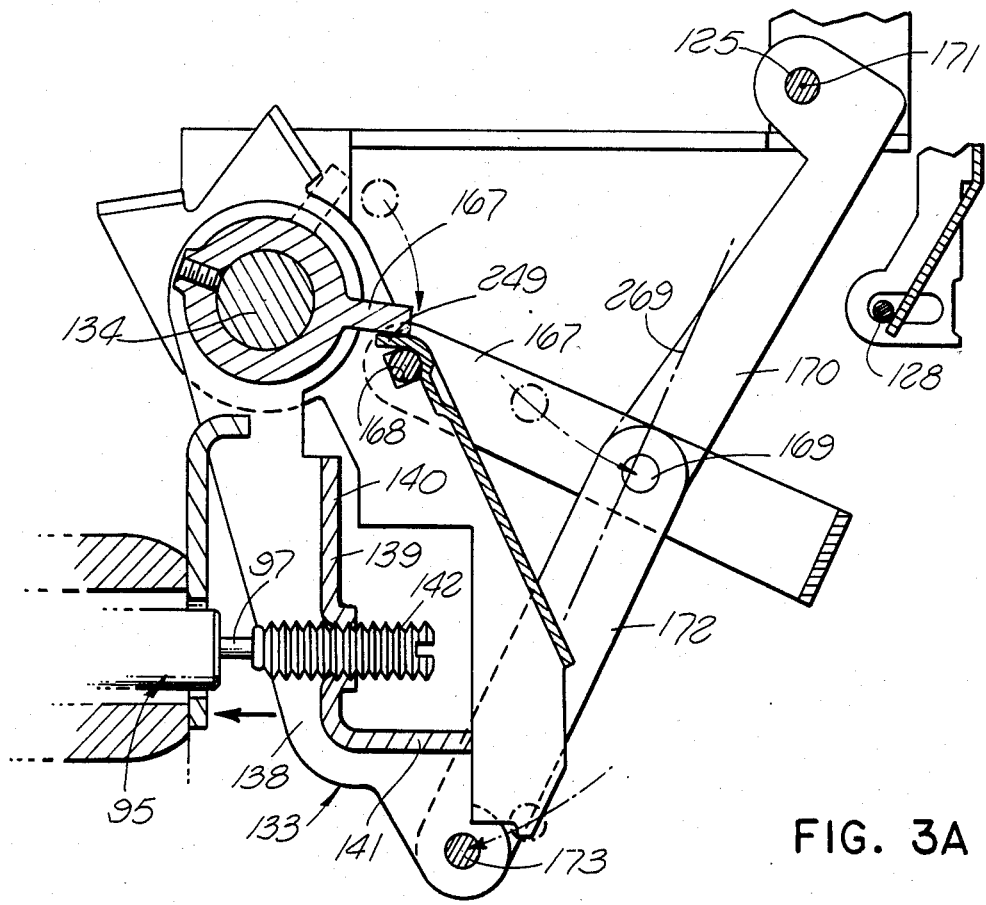
FIG. 3A shows the mechanism of FIG. 3 in actuated condition.

The swinging movement of arm 133 between its FIG. 3 and FIG. 3A positions is relatively slight, but adapted to apply substantial force to the valve element 95 in order to open that valve against the valve spring and a fairly high air pressure. This force is developed by spring induced swinging movement of a second arm 145 through a much greater angle, with a connection between the arms designed to attain a mechanical advantage increasing the applied force. Arm 145 like the discussed arm 133 may be stamped from a single piece of sheet material, forming two spaced side walls 146 having parallel portions 246 containing openings 147 within which shaft 134 is closely received to mount arm 145 for swinging movement about axis 135. In extending farther radially away from axis 135, the side walls of arm 133 converge progressively toward one another at 148, and have extremities containing a notch 150 within which pin 128 of the inertia actuated mechanism 103 is receivable in the FIG. 3 latched condition of the parts. Upon upward swinging movement of arm 145 toward that latched position, camming surfaces 151 on side walls 146 of arm 145 engage pin 128 to progressively deflect it in a direction away from axis 135 against the tendency of spring 129 and then ultimately allow the pin to fall into notch 150 to latch arm 145 in its FIG. 3 position. The side walls 146 of arm 145 are joined together by a transverse wall 149 of arm 145 and two transverse elements 249 and 349 all stamped integrally from the same sheet material of which side walls 146 are formed and extending therebetween. Elements 249 and 349 may serve as indicators, having words printed thereon which are visible through a transparent sealed window 192 (FIG. 1) to indicate to an operator whether valve 95 is open or closed.

Arm 145 may be yieldingly urged in a clockwise direction from its FIG. 3 position to its FIG. 3A position by spring means, typically taking the form of a coil spring 152 disposed about shaft 134 and having a first end 153 bearing against one of the bracket arms 137 projecting downwardly from plate 101, and a second end 154 (FIG. 4) bearing downwardly against the upper wall 149 of arm 145. A pin 155 is attached to arm 145 in fixed relative position, as by reception within aligned notches 255 in side walls 146 and retention in those notches by a portion 249 of top wall 149. Pin 155 extends along an axis 156 which is parallel to axis 135 and to the various pivot pins 119, 121, 124 and 125 of the inertia actuated control mechanism 103. Arm 145 is adapted to be manually actuated from its FIG. 3A released position to its FIG. 3 latched position by manual rotation of shaft 134, which can be effected by engagement of a screwdriver or other tool with a short extension shaft 154 extending through an opening 158 in the side wall of body section 92. This short shaft 157 may be sealed with respect to opening 158 by an O-ring 159, and have a screwdriver slot 160 at its outer end by which the shafts can be turned, with a projection 161 at the inner end of shaft 159 projecting into a mating transverse slot 162 formed in the primary shaft 134, to transmit rotary motion therebetween. A retainer wire 163 may extend downwardly through vertical passages in a top portion of part 92 and be received within a groove 164 in shaft 157 in a relation retaining that shaft against withdrawal from passage 158 while permitting rotation thereof. Rotary motion can be transmitted from the principal shaft 134 to arm 145 by providing a central portion of shaft 134 with a tubular drive member 165 received about the shaft and keyed thereto as by a set screw 266, and having a lug 167 projecting radially outwardly therefrom at a location to engage portion 249 of arm 145 and swing that arm in a counterclockwise direction from the position of FIG. 3A to the position of FIG. 3 as a result of shaft rotation. Shaft 134 and part 165 have a lost motion connection to arm 145, enabling them to be turned relative to arm 145 between the full line position of lug 167 in FIG. 3 and its broken line position. The shaft and part 165 are yieldingly urged in a clockwise direction to the position of FIG. 3A by a coil spring 252 disposed about the shaft and having a first end 253 bearing against one of the bracket portions 137 of plate 101 and a second end 254 extending into a diametrical slot 354 formed in the end of shaft 134.

The swinging movement of arm 145 is transmitted to arm 133 by a U-shaped link member 165 and two link assemblies 166. Member 165 has two parallel arms 167 containing openings 168 at their ends through which the opposite ends of the previously mentioned pin 155 connected to arm 145 extend. At locations spaced from this pin 155, portions 167 of member 165 are pivotally connected to two additional pins 169, by extension of those pins through openings in portions 167, and with those pins 169 also serving as the central pivot pins of the two link assemblies 166 respectively. Each of those assemblies 166 includes a first link 170 whose upper end contains an opening through which a corresponding end of pin 125 of the inertia actuated mechanism projects, to mount the two links 170 for swinging movement about the axis 171 of pin 125. At their lower ends, the links 170 of the two assemblies 166 are pivotally connected to two pins 169, which are also pivotally connected to the upper ends of two lower links 172 of assemblies 166. The lower ends of those links 172 are connected by a pin 173 to the two spaced side walls 138 of arm 133. It will of course be understood that the axes of pivot pins 155, 169 and 173 are parallel to the main horizontal pivotal axis 135 of arms 133 and 145, in order to attain operation of the mechanism in the manner discussed hereinbelow.

In placing the apparatus in use, compressed air may first be filled into tank 24 to a proper operating pressure, say eighty pounds per square inch, as indicated by a gauge 174 communicating through a passage 175 with the interior of the tank. The compressed air may be filled into the tank through a fill connection 176, including a check valve of the type usually employed in inflatable equipment. During such filling of the tank, the valve actuating mechanism 104 in the lower portion of unit 23 is in its FIG. 3 condition, in which arms 133 and 145 are swung in a counterclockwise direction to leave valve 95 in its closed condition preventing escape of air from tank 24 into the interior of unit 23. Mechanism 104 is actuated to this condition by manual counterclockwise rotation of shafts 154 and 134 by a screwdriver received in slot 160. As shaft 134 and the connected part 167 are turned in a counterclockwise direction from the position of FIG. 3A toward the position of FIG. 3, lug 167 on part 165 first swings through a lost motion angle to a point of engagement with indicator portion 249 of arm 145 (broken line position 167 in FIG. 3A) after which continued movement of lug 167 causes arm 145 to swing about axis 135 to the position of FIG. 3 in which it is retained by latch pin 128. After the arm has thus been latched, the operator removes the resetting screwdriver from engagement with shaft 157, permitting that shaft and shaft 134 to be returned by spring 252 to the full line position of FIG. 3 in which its movement is limited by engagement with an edge of portion 249 of arm 135.

If the shock responsive unit 23 is subjected to earthquake forces of the intensity for which the apparatus is designed, those forces will displace ball 110 laterally relative to the rest of the parts of unit 23 by inertia effects, causing the ball to engage the upper edge of tube 116 and displace that tube downwardly, swinging pin 128 out of notch 150 in arm 145, and thereby freeing arm 145 for spring induced swinging movement from its FIG. 3 position to its FIG. 3A position. This swinging movement of arm 145 acts through link member 165 to cause rightward displacement of the central pivot pins 169 of the two overcenter link assemblies 166, from their FIG. 3 position to their FIG. 3A position. This displacement of the central pivot pins of the overcenter assemblies relative to the pins 125 and 173 at their upper and lower ends acts to increase the effective length of assemblies 166 between their upper pivot pins 125 and their lower pins 173, which by virtue of the fact that the upper pins are fixed relative to the housing of the device causes slight downward and leftward movement of the lower pivot pin 173 and the connected lower end portion of arm 133, moving valve actuating element 142 against the stem of valve 95 to open that valve and admit compressed air from tank 24 into the interior of the housing of shock responsive unit 23. In the FIG. 3A released condition of the mechanism beneath mounting plate 103, the two links 170 and 172 of each of the assemblies 166 are preferably slightly beyond a center position, that is, the axis of their central pins 169 is slightly beyond a position of alignment with a plane 269 containing the axes of their end pins 125 and 173, to thus lock the assemblies 166 and the connected arm 133 in the FIG. 3 position and prevent unintended closure of valve 95, and to retain the valve open against the substantial pressure of the air contained within tank 24. It is contemplated that the apparatus could function without such movement to an overcenter position, with a loss in effectiveness of the locking action, but in any event axis 169 should at least reach or very closely approach the 'center' position of alignment with the axes of pins 125 and 173.

When the air from tank 24 is released into the interior of lower section 92 of the body of unit 23, that air immediately flows from chamber 98 in section 92 through line 62 to the device 10 to cause its operation in a desired manner. As an example, device 10 may typically be a valve actuator functioning to close a valve in a gas line or the like by spring force or other power in response to seismic actuation of unit 23.

While a specific embodiment of the present invention has been disclosed as typical, the invention is of course not limited to this particular form, but rather is applicable broadly to all such variations as fall within the scope of the appended claims.

We claim:

1. A seismic actuator comprising:
   a first arm mounted for swinging movement about an axis between first and second positions;
   means yieldingly urging said first arm about said axis and toward said second position thereof;
   a latch element engageable with said first arm at a location offset from said axis in a relation releasably retaining said first arm in said first position;
   shock responsive means operable in response to shock forces to actuate said latch element in a direction automatically releasing said first arm for movement by said yielding means to said second position;
   a second arm operable by swinging movement to actuate a controlled element;
   first and second links connected pivotally together at first ends thereof and connected pivotally at second ends to a support structure and to said second arm respectively; and
   a third link extending between said first arm and at least one of said first and second links and operable to swing said first and second links from relatively angularly disposed positions toward essentially aligned positions in response to swinging movement of said first arm toward said second position thereof and in a relation swinging said second arm through an angle smaller than said first arm in a direction to actuate said controlled element.

2. A seismic actuator as recited in claim 1, including means connecting said third link to said first arm pivotally at a location closer to said axis than said location at which said latch element engages said first arm.

3. A seismic actuator comprising:
a first arm mounted for swinging movement about an axis between first and second positions and yieldingly urged toward said second position;
shock responsive means for releasably retaining said first arm in said first position and operable in response to shock forces to automatically release the arm for movement to said second position;
a second arm operable by swinging movement about said axis to actuate a controlled element;
first and second links connected pivotally together at first ends thereof and connected pivotally at second ends to a support structure and to said second arm respectively; and
a third link extending between said first arm and at least one of said first and second links and operable to swing said first and second links from relatively angularly disposed positions toward essentially aligned positions in response to swinging movement of said first arm toward said second position thereof and in a relation swinging said second arm through an angle smaller than said first arm in a direction to actuate said controlled element.

4. A seismic actuator as recited in claim 3, in which said shock responsive means include an inertia actuated weight, a structure movable relative to said weight by said shock forces, and latch means for releasably retaining said first arm in said first position thereof and responsive to said relative displacement between said weight and said last mentioned structure to release said first arm for swinging movement to said second position thereof, there being resetting means for swinging said first arm from said second position to said first position, and means pivotally connecting said third link at spaced locations to said first arm and to said first and second links for pivotal movement relative to said first and second links about the axis of the pivotal connection therebetween, said third link being operable upon swinging movement of said first arm toward said second position thereof to swing said first and second links to a slightly overcenter position in which said pivotal axis of the connection between said first ends thereof is slightly beyond a position of alignment with pivotal axes at second ends of the first and second links.

5. A seismic actuator as recited in claim 3, in which said shock responsive means include a latch element engageable with said first arm to releasably retain it in said first position thereof.

6. A seismic actuator as recited in claim 3, in which said third link is operable upon swinging movement of said first arm toward said second position thereof to swing said first and second links to a slightly overcenter position in which a pivotal axis between their first ends is slightly beyond a position of alignment with the pivotal axes at their second ends.

7. A seismic actuator as recited in claim 3, including said controlled element as an element of the claim and comprising a valve normally urged to closed position and actuable to open position by said swinging movement of said second arm.

8. A seismic actuator as recited in claim 3, in which said third link is pivotally connected to both of said first and second links for relative pivotal movement about the axis of the pivotal connection between said first ends of said first and second links.

9. A seismic actuator as recited in claim 3, including manual resetting means for swinging said first arm from said second position to said first position thereof.

10. A seismic actuator as recited in claim 3, in which said shock responsive means include an inertia actuated weight, a structure movable relative to said weight by said shock forces, and latch means for releasably retaining said first arm in said first position thereof and responsive to said relative displacement between said weight and said last mentioned structure to release said arm for swinging movement to said second position thereof.

* * * * *